Patented May 20, 1941

2,242,488

UNITED STATES PATENT OFFICE 2,242,488

METHOD FOR CONVERTING PARAFFINIC HYDROCARBONS INTO OLEFINS

Carlisle M. Thacker, Toledo, Ohio, assignor to The Pure Oil Company, Chicago, Ill., a corporation of Ohio No Drawing. Application December 10, 1937, Serial No. 179,175

3 Claims. (Cl. 260—683)

This invention relates to method for converting low boiling paraffinic hydrocarbons, such as ethane, propane and the butanes, or mixtures thereof, into olefinic hydrocarbons, such as ethylene, propylene and butylene, or mixtures thereof.

I have discovered that dehydrogenation of low boiling saturated hydrocarbons can be effected to an extent suitable for commercial utilization by contacting such hydrocarbons at elevated temperatures with catalysts containing silica gel and a mild dehydrogenating catalyst such as chromium oxide, magnesium and chromium oxide mixture, copper, zinc oxide, manganese oxide, magnesium oxide, blue tungsten oxide, vanadium oxide, and copper tungstate, or mixtures of these various metals and compounds.

The catalyst is preferably prepared by mixing salt solutions of the desired metal or metals with silica gel in the desired portions and heating the mixture, with frequent stirring, until almost dry and then completing the drying at a temperature slightly above the boiling point of water. The dry catalyst is then decomposed by contacting it with air at elevated temperature in order to convert the metallic compounds to oxides. The decomposed catalyst is then contacted with a reducing gas, such as hydrogen, at elevated temperature for a relatively long period of time and is then ready for use.

The gases which it is desired to convert into olefins may be contacted with the catalyst at temperatures ranging from 350°–750° C., depending upon the composition of the gas and the space velocity thereof. With the heavier gases, such as butanes, the temperature of contact is lower than that required for dehydrogenation of propane and ethane, and similarly the dehydrogenation of propane is lower than that required for ethane. Where gas mixtures are treated, the optimum temperature will depend upon the relative proportions of the several constituents in the mixture and will lie somewhere between the optimum temperatures for the highest and lowest boiling constituents.

The process may be carried out in any conventional apparatus under pressures which may be atmospheric, sub-atmospheric or super-atmospheric. The charging gas is preferably preheated to conversion temperature prior to contacting it with the catalyst. The catalyst chamber or reactor is preferably heated to maintain it at reaction temperature. The charging gas is preferably dried prior to contacting with the catalyst since water vapor or steam lowers the activity of the catalyst.

As an example of a catalyst which may be used in accordance with my invention, chromic acid (19.6 grams) was dissolved in water (100 c. c.) and added to silica gel (400 grams) that had previously been heated at 110°–120° C. for 2 hours. The mixture was well stirred and then dried over night in an electric oven at 110°–120° C. The dry material was screened through an 8 to 14 mesh sieve and reduced in a stream of methanol and hydrogen by gradually increasing the temperature to 250° C. over a period of 1 to 2 hours and then continuing the reduction at 250° C. for 2 hours. The catalyst was then heated for 15 hours in dry hydrogen at 450° C., after which it was ready for use in the dehydrogenation of hydrocarbons. Although the catalyst was reduced over night in the presence of hydrogen, such a long reduction treatment is unnecessary. About 2 hours at 400°–450° C. is ample.

In preparing the various catalysts, the soluble salts or acids of the particular metal or metals which it is desired to use, may be mixed with silica gel and treated in the same manner as set forth with regard to the chromic acid-silica gel mixture.

The following are specific examples of results obtained with the chromium oxide-silica gel catalyst made as above described.

Example I

Dry gas composed chiefly of ethane was contacted with a catalyst composed of chromium oxide supported on silica gel, prepared in the manner above set forth. The gas was contacted with the catalyst at a temperature of 525° C. and at a space velocity of 492 cu. ft. per hour per cu. ft. of reaction space. As a result thereof, 6.4% of the ethane reacted, giving a yield of ethylene based on the total charge, of 4.9%. The reaction gas contained 6.9% of ethylene and 6.8% of hydrogen.

Example II

In another run with the same catalyst and using the same gas, the temperature was maintained at 550° C. and 8.2% of the ethane reacted, giving a yield of ethylene based on the total charge, of 6.2%. The reaction gases contained 8% of ethylene and 8.2% of hydrogen.

Both runs were conducted at atmospheric pressure. The efficiency, that is, the percent of ethane reacting which was converted to ethylene, was between 85 and 90%.

In order to compare the results of this catalyst with silica gel alone, a run was made with the same gas, using silica gel as a catalyst at a temperature of 650° C. and a space velocity of 107. Under these conditions, a yield of .8% was obtained and the reaction gas contained 2.9% of ethylene and 3.1% of hydrogen.

A run was also made using chromium oxide supported on pumice in which the gas was contacted with the catalyst at a temperature of 600° C. and a space velocity of 337. The reaction gas contained 2.6% of ethylene and 2.3% of hydrogen. The yield was so low that it was not accurately measurable. Using the same catalyst at 675° C. at the same space velocity, a yield of 1.4% was obtained and the reaction gas contained 3.8% of ethylene and 2.8% of hydrogen.

These results clearly show that the combination of the chromium oxide with the silica gel gives unusual results since the activity of the catalyst is far in excess of the combined activity of silica gel and chromium oxide. Even when these latter two materials were used at temperatures considerably in excess of those at which the chromium oxide supported on silica gel was used and the space velocity of the test was considerably lower, the activity of either material alone was far below that of the chromium oxide on silica gel. Increase in temperature increases the activity of the catalyst, and decreases in space velocity also effects a greater amount of conversion, so that if the chromium oxide-silica gel catalyst is used at temperatures of 600° C., much larger yields of ethylene are obtained.

Although I have found that chromium oxide on silica gel gives the best results, the results obtained with the other catalysts mentioned are superior to those obtained with catalysts heretofore known and used. It will be understood that the proportion of the silica gel and mild dehydrogenating catalyst may be varied over wide limits, but in general, it is preferable to use a catalyst in which the silica gel forms the major portion thereof.

The catalysts above described have the ability of maintaining their activity over longer periods of time than catalysts heretofore proposed, and when their activity has fallen off to such an extent as to render them unsuitable for further operation, they can be readily reactivated to substantially their initial activity by heating in the presence of air and reducing in the presence of a reducing gas, such as hydrogen, in the manner disclosed in the preparation of the original catalyst.

What I claim is:

1. The method of dehydrogenating low boiling paraffinic hydrocarbons into olefinic hydrocarbons of the same number of carbon atoms which comprises contacting the paraffinic hydrocarbons at reacting temperature with a catalyst prepared by impregnating silica gel with a solution of copper tungstate, drying the impregnated gel, decomposing it by means of air at elevated temperature and subjecting the decomposed material to the reducing action of hydrogen at elevated temperature.

2. Method in accordance with claim 1 in which the reacting temperature is between 350° and 750° C.

3. Method in accordance with claim 1 wherein the low boiling paraffinic hydrocarbons are those hydrocarbons which contain two, three or four carbon atoms.

CARLISLE M. THACKER.